United States Patent Office 3,700,644
Patented Oct. 24, 1972

3,700,644
DEEP DYEABLE COPOLYESTER RESINS
John A. Price, Swarthmore, and Mary J. Stewart, Media, Pa., assignors to FMC Corporation, Philadelphia, Pa.
No Drawing. Filed Mar. 31, 1971, Ser. No. 129,945
Int. Cl. C08g 17/08
U.S. Cl. 260—75 S    6 Claims

ABSTRACT OF THE DISCLOSURE

A copolyester resin product of (a) an aromatic dicarboxylic acid or its lower alkyl diester, (b) a glycol and (c) a minor amount of a compound represented by the formula

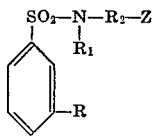

wherein R is —$COOR_3$ or

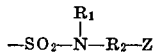

$R_1$ is a lower alkyl radical containing from 1 to 6 carbon atoms, $R_2$ is a $C_2$ to $C_6$ alkylene radical, $R_3$ is hydrogen or a lower alkyl radical containing from 1 to 6 carbon atoms, and Z is a hydroxyl or —$COOR_3$ radical.

This invention relates to highly polymeric linear copolyester resins which have improved dyeability. More particularly, the present invention relates to novel copolyester resins which can be formed into filaments, films or other shaped articles and which can be readily dyed with disperse type dyes.

Many types of random copolyesters have been described in the prior art and it is known that they can be prepared by various well known processes. For example, copolyester resins can be prepared by a direct esterification and polycondensation process or by a transesterification and polycondensation process. In the case of the direct esterification method, the reactants used consist of suitable dicarboxylic acids and glycols; whereas in a transesterification method, lower alkyl diesters of suitable dicarboxylic acids and glycols are used as the initial reactants.

A copolyester resin such as those of the present invention which are suitable for filament- and film-forming processes should have a relatively high intrinsic viscosity preferably not less than about 0.60 (determined in a 60% phenol—40% tetrachloroethane solution, wt./wt. at 30° C.), a carboxyl content value of below about 50 equivalents per million grams (eq./$10^6$ gr. or meq./kg.) and also exhibit a relatively colorless or white color. Additionally, especially for filament-forming purposes, it is very desirable and necessary in many instances that the polyester resin be readily dyeable to deep shades with disperse dyes.

It is an object of this invention to provide novel highly polymeric saturated copolyester resins.

It is another object of this invention to provide highly polymeric linear copolyester resins which have physical and chemical properties which make them particularly well suited for filament- and film-forming purposes.

It is a further object of the present invention to provide highly polymeric random copolyester resins which are easily dyeable with disperse dyes.

These and other objects are accomplished in accordance with the present invention by providing a highly polymeric copolyester resin comprising the condensation polymerization product of (a) an aromatic dicarboxylic acid or its lower alkyl diester, (b) a glycol and (c) an effective amount of a compound represented by the formula.

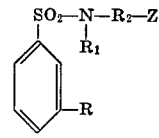

wherein R is —$COOR_3$ or

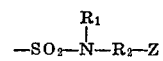

$R_1$ is a lower alkyl radical containing from 1 to 6 carbon atoms, $R_2$ is a $C_2$ to $C_6$ alkylene radical, $R_3$ is hydrogen or a lower alkyl radical containing from 1 to 6 carbon atoms, and Z is a hydroxyl or —$COOR_3$ radical. By "effective amount" is meant sufficient molar concentration to result in formation of a copolyester resin and filaments prepared therefrom to be dyeable with disperse dyes under normal dyeing procedures such as, for example, as set forth hereinafter.

The random copolyester resins of the present invention can be prepared as stated above by either a transesterification or direct esterification process. In either instance, all of the reactants can be initially combined and charged into suitable reactors wherein one of the subject processes is carried out.

The preferred aromatic dicarboxylic acid or diester used to prepare the present copolyester resins is terephthalic acid or its dimethyl ester. However, linear polyesters prepared from any diol and aromatic dicarboxylic acid or diester can be modified with the present sulfonamide monomers to obtain the desired result. Other aromatic dicarboxylic acids that can be used, generally in combination with terephthalic acid, are p,p'-sulfonyl dibenzoic acid, 2,7-naphthalene dicarboxylic acid, isophthalic acid, p,p'-diphenic acid and 1,2-di-(p-carboxyphenoxy)ethane.

Among the glycols which can be used in the preparation of the subject copolyester resins are any of these represented by the general formula HO($CH_2$)$_n$OH wherein $n$ is a whole number of from 2 to 10. For example, among the glycols that can be used are ethylene glycol, butylene glycol, hexamethylene glycol and decamethylene glycol. Additionally, the gem-dialkyl glycols such as 2,2-dipropy-1,5-pentanediol, 2,2-dimethyl-1,3-propanediol, 2,2-diethyl-1,3-propanediol, 2,2-dimethyl-1,4-butanediol, 3,3 - dimethyl - 1,5-pentane-diol, 2-ethyl-2-methyl-1,3-propanediol and 2,2-dibutyl-1,3-propanediol can be used as the glycol component. Further, cycloaliphatic glycols such as 1,4-cyclohexanedimethanol can also be used. The above types of glycols can be used either singularly or in combination dependent on product desired.

Any of the sulfonamide compounds coming within the above general formula (c) can be used to prepare the present copolyester resins. Specifically, it has been determined that any linear polyester resin can be upgraded in regard to dyeability with disperse dyes by copolymerizing with said polyester resin reactants from 1 to 20 mole percent, based on the diester or dicarboxylic acid content of the reaction mixture, of a sulfonamide compound coming within the above general description. In most instances, however, it has been found that copolyester resins derived from 1.5 to 10 mole percent of the subject sulfonamides based on the diester or dicarboxylic acid content of the reaction mixture are preferred in view of dyeability obtained and other physical properties.

For example among the sulfonamide compounds which can be used as monomers in the preparation of the present copolyester resins are:

bis-[N-(2-hydroxyethyl)-N-methyl]-m-benzenedisulfonamide
bis-[N-(3-hydroxypropyl)-N-propyl]-m-benzenedisulfonamide
bis-[N-(5-hydroxypentyl)-N-methyl]-m-benzenedisulfonamide
bis-[N-(4-hydroxybutyl)-N-butyl]-m-benzenedisulfonamide
bis-[N-(4-hydroxybutyl)-N-butyl]-m-benzenedisulfonamide
bis-[N-(2-carboxylethyl)-N-methyl]-m-benzenedisulfonamide
bis-[N-(3-carboxylpropyl)-N-propyl]-m-benzenedisulfonamide
methyl m-[N-(2-hydroxyethyl)-N-methylsulfamoyl] benzoate
butyl m-[N-(5-hydroxypentyl)-N-propylsulfamoyl] benzoate
propyl m-[N-(4-hydroxybutyl)-N-butylsulfamoyl] benzoate
methyl m-[N-3-hydroxypropyl)-N-methylsulfamoyl] benzoate
ethyl m-[N-(2-hydroxyethyl)-N-hexylsulfamoyl] benzoate
m-[N-(2-hydroxyethyl)-N-methylsulfamoyl]benzoic acid
m-[N-(4-hydroxybutyl)-N-propylsulfamoyl]benzoic acid
m-[N-(2-carboxyethyl)-N-methylsulfamoyl]benzoic acid
m-[N-(4-carboxybutyl)-N-butylsulfamoyl]benzoic acid The sulfonamide compounds used in the present invention are prepared by reacting a suitable benzene sulfonyl chloride reactant as listed hereinafter with an alkylaminoalkanoic acid or alkylaminoalkanol depending on product desired as indicated by the following general reaction:

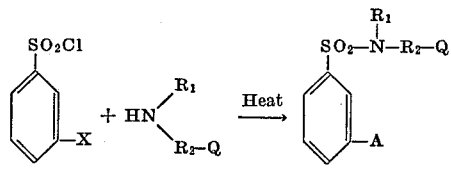

wherein X is a —SO₂Cl or —COOH radical, R₁ is a lower alkyl radical containing from 1 to 6 carbon atoms, A is a —COOH or

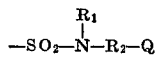

radical, R₂ is a C₂ to C₆ alkylene radical and Q is a hydroxyl or a carboxyl radical. Obviously, the concentration of reactants in the above-noted reaction must be suitably varied depending on whether a mono- or disulfonamide is to be prepared. The above reaction can be readily carried out in an excess of benzene as the reaction media if desired.

The lower alkyl esters (C₁ to C₆) of the above indicated reaction products (P) containing one or more carboxyl groups can be prepared by using standard esterification techniques well known to those skilled in the present art. For example, the esterification of products (P) above can be accomplished as illustrated in the following reaction:

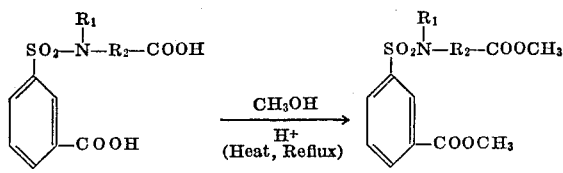

wherein the letters represent the same radicals as indicated above. Obviously, the alkanol reactant can be varied dependent on the particular lower alkyl ester desired.

The sulfonyl chloride reactants used to prepare the present sulfonamide compounds are m-benzenedisulfonyl chloride or m-chlorosulfonylbenzoic acid.

Among the alkylaminoalkanols that can be used to prepare the above group of sulfonamide compounds are 2-methylamino-1-ethanol, also known as 2-(methylamino) ethanol, 3-methylamino-1-propanol, 2-butylamino-1-ethanol, 4-methylamino-1-butanol, 6-methylamino-1-hexanol, 2-hexylamino-1-ethanol, 2-propylamino-1-ethanol, and 5-propylamino-1-pentanol.

Among the alkylaminoalkanoic acids that can be used to prepare the above group of sulfonamide compounds are 2-methylamino-1-ethanoic acid, 2-butylamino-1-ethanoic acid, 4-methylamino-1-butanoic acid, 6-methylamino-1-hexanoic acid and 2-hexylamino-1-ethanoic acid.

The following two examples will further illustrate the preparation of the subject sulfonamide monomers.

EXAMPLE 1

Preparation of bis-[N-(2-hydroxyethyl)-N-methyl-m-benzenedisulfonamide

To a solution of 36.2 grams (0.132 mole) of m-benzenedisulfonyl chloride in 100 mls. of benzene was added, dropwise with stirring over a 45 minute period, 39.5 grams (0.525 mole) of 2-(methylamino)ethanol. The temperature was kept below 40° C. with an ice bath, until all of the 2-(methylamino)ethanol was added. Then, the reaction mixture was slowly warmed to room temperature and finally refluxed for two hours. The resulting reaction mixture was then kept at room temperature for 72 hours. Two phases formed and the mixture was evaporated in vacuo to a heavy oil. The residue was dissolved in chloroform, washed several times with saturated saline solution, dried over magnesium sulfate, filtered and dried in vacuo. The product formed was identified as bis-[N-(2-hydroxyethyl)-N-methyl]-m-benzenedisulfonamide.

EXAMPLE 2

Preparation of methyl m-[N-(2-hydroxyethyl)-N-methylsulfamoyl]benzoate

To 150 ml. (140 grams, 1.87 moles) of 2-methylamino) ethanol previously cooled to 10° C., was added, portionwise over 25 minutes 54.2 grams (0.244 mole) of m-chloro-sulfonylbenzoic acid. The reaction mixture was allowed to slowly warm to room temperature and was then heated at 83° C. for two hours. After standing overnight, the mixture was poured into an ice water slush and made acidic with 6 N-hydrochloric acid. Crystalline material that formed was filtered, dried and identified as m-[N-(2-hydroxyethyl)-N-methylsulfamoyl]benzoic acid hemihydrate.

The methyl ester of the above prepared acid was prepared as follows:

A one liter round-bottomed flask equipped with a condenser, mechanical stirrer and Dean-Stark apparatus was charged with 50 grams (0.187 mole) of m-[N-(2-hydroxyethyl)-N-methylsulfamoyl]benzoic acid, 425 ml. of absolute methanol, 75 ml. of benzene and 5 grams IR 120 (H⊕ form) Amberlite Resin. The resulting mixture was refluxed. A portion of the distillate containing water was removed every four hours. In order to hasten the esterification reaction to completion, 200 ml. of 2,2-dimethoxypropane was added and the heating continued for an additional 72 hours. On cooling, the precipitate was filtered off. The filtrate was concentrated in vacuo to a thick oil. The residue was extracted with diethyl ether and concentrated under a slow stream of nitrogen to yield methyl m-[N-(2-hydroxyethyl)-N-methylsulfamoyl]benzoate.

The above prepared methyl ester derivative could also be prepared directly by placing m-[N-(2-hydroxyethyl)-

N-methylsulfamoyl]benzoic acid in an excess of 2,2-dimethoxy propane and refluxing the resulting mixture to yield the desired methyl ester product.

As stated above, the present copolyester resins may be prepared by either a transesterification or direct esterification process.

In the case of the ester-interchange or transesterification method, a mole ratio of diol to suitable diester of from about 1:1 to about 15:1 may be used, for preferably from about 1.5:1 to about 2.6:1. The transesterification reaction is generally carried out at atmospheric pressure in an inert atmosphere such as nitrogen, initially at a temperature range from about 125° C. to about 250° C. but preferably from about 150° C. to 200° C. in the presence of a transesterification catalyst. An alkyl alcohol corresponding to the dialkyl ester of the dicarboxylic acid used is evolved and continuously removed by distillation. After a reaction perod of 1 to 2 hours, the temperature of the reaction mixture is raised from about 200° C. to about 230° C. for approximately 1 to 3 hours in order to complete the reaction, from the desired polyester prepolymer and distill off my excess diol which is present.

Any of the well known and suitable transesterification or ester-interchange catalyst, for example, lithium amide, lithium hydride, or zinc acetate can be used to catalyze the present transesterification reaction. In most instances, the transesterification catalyst is used in concentrations ranging from 0.01% to about 0.20% based on the weight of the dialkyl ester of the dicarboxylic acid used in the initial reaction mixture.

Alternatively, the preparation of the subject prepolymers or polyester resins can be achieved via the direct esterification method. In the case of the direct esterification method, a mole ratio of diol to dicarboxylic acid of from about 1.2:1 to about 15:1, but preferably from about 1.5:1 to about 2.6:1, is used. The initial steps of the direct esterification reaction are generally carried out at temperatures ranging from about 180° C. to about 280° C. in the absence of an oxygen-containing atmosphere at atmospheric or elevated pressure for about 2 to 4 hours to form the desired polyester prepolymer. For example, the reactions may be carried out in an atmosphere of nitrogen.

Any of the well known and suitable first stage direct esterification catalytic additives can be used in the preparation of the present copolyester resins via the direct esterification method. For example, triethylamine or calcium acetate may be used. The first stage catalytic additives are generally employed at concentrations ranging from about $5 \times 10^{-5}$ mole to about $5 \times 10^{-2}$ mole of catalytic additive per mole of dicarboxylic acid used in the initial reaction mixture.

The polycondensation of the prepolymers prepared by one of the above processes is accomplished by adding a suitable polycondensation catalyst to the polyester prepolymer or prepolymers as defined above and heating the blend thereof under reduced pressures of within the range of about 0.05 mm. to 20 mm. of mercury while under agitation at a temperature of about 260° C. to 325° C. for from 2 to 4 hours. Any suitable polycondensation catalyst can be used, for example, antimony oxlate, antimony trioxide or disodium lead ethylene diamine tetraacetate.

Several preferred embodiments of the resins of the present invention are further illustrated by the following examples.

EXAMPLE 3

300 grams of dimethylterephthalate, 198 mls. of ethylene glycol, 12.7 grams of methyl m-[N-(2-hydroxyethyl)-N-methylsulfamoyl]benzoate (3 mole percent based on dimethyl terephthalate content) and 0.12 gram of lithium hydride were charged to a reaction vessel equipped with a nitrogen inlet, a distilling arm, heating means and stirring means. The reaction mixture was agitated and heated at atmospheric pressure to about 198° C. for about 2 hours during which time by-product methyl alcohol was distilled off as formed. When the subject transesterification reaction was approximately 80% complete as indicated by the amount of methyl alcohol given off, the temperature was allowed to raise to about 230° C. over a period of about 1 hour to distill off any remaining methyl alcohol and some excess glycol and to complete the reaction to form the desired polyester prepolymer. The prepolymer was then cooled in a nitrogen atmosphere.

50 grams of the above prepared prepolymer and 0.02 gram of antimony trioxide was placed in the reaction vessel. The reaction mixture was heatted at about 280° C. under reduced pressure of about 0.1 mm. mercury while under agitation for about 2 hours to bring about the polycondensation of the prepolymer and formation of a copolyester resin. The copolyester resin formed had an intrinsic viscosity of 0.72 and a carboxyl value of 10 meg./kg.

The resulting resin was spun into fibers of 250 denier per 10 filaments and then drawn to a 70 denier per 10 filaments.

EXAMPLE 4

300 grams of dimethyl terephthalate, 198 mls. of ethylene glycol, 8.16 grams of bis-[N-(2-hydroxyethyl)-N-methyl]-m-benzenedisulfonamide (1.5 mole percent based on dimethyl terephthalate content) and 0.12 gram of lithium hydride were charged to a reaction vessel equipped with a nitrogen inlet, a distilling arm, heating means and stirring means. The reaction mixture was agitated and heated at atmospheric pressure to about 198° C. for about 2 hours during which time by-product methyl alcohol was distilled off as formed. When the subject transesterification reaction was approximately 80% complete as indicated by the amount of methyl alcohol given off, the temperature was allowed to rise to about 230° C. over a period of about 1 hour to distill off any remaining methyl alcohol and some excess glycol and to complete the reaction to form the desired polyester prepolymer. The prepolymer was then cooled in a nitrogen atmosphere.

50 grams of the above prepared prepolymer and 0.02 gram of antimony trioxide was placed in the reaction vessel. The reaction mixture was heated at about 280° C. under reduced pressure of about 0.1 mm. mercury while under agitation for about 2 hours to bring about the polycondensation of the prepolymer and formation of a copolyester resin. The copolyester resin formed had an intrinic viscosity of 0.62 and a carboxyl value of 10 meq./kg.

The resulting resin was spun into fibers of 250 denier per 10 filaments and then drawn to 70 denier per 10 filaments.

For illustration purposes, the dyeability of the copolyester resin products of the present invention were tested with disperse dyes. The numerical values given below the heading "Disperse Dye Value" were obtained by measuring the reflectance of the dyed resin product with a "Color Eye" (Model–D–1) which is the trade name for a differential colorimeter manufactured by the Instrument Development Laboratories, Attleboro, Mass. The color values obtained are based on luminance (Y in the C.I.E. System) which is a measure of the proportion of the incidence light reflected by the sample relative to a white vitrolite standard and, therefore, a measure of the whiteness of the copolyester resin product being evaluated. Based on a theoretically possible Y value of 100, the higher the Y value, the whiter the resin product. Correspondingly, the lower the Y value or number, the more deep or intense the color of the dyed resin product. The determination of Y on the C.I.E. System as hereinafter set forth was carried out by using knitted sleeves prepared from the copolyester fiber products made in Examples 3 and 4 above.

The knitted sleeves prepared from the subject copolyester resin samples were subjected to the following dyeing procedure.

Disperse dye test

A bath containing 6.25 mls. of a 1% Duponal RA Solution, 12.5 mls. of a 10% Latyl Carrier A Solution and 225 mls. water was heated to about 130° F. (The 10% carrier solution must be heated to dissolve most of the solids—the "solution" is then mixed well before taking the aliquot.) A 1% dye solution was prepared by passing 0.25 g. Latyl Blue RB with 0.25 g. DS–14 (dispersing agent supplied by Tenatex Chemical Company, Lynnhurst, N.J.). The paste was then diluted to 25 mls. with water. The copolyester sample sleeves were soaked in the carrier bath for 10 minutes and then 6.25 mls. of the 1% dye solution was stirred into said carrier bath containing said sleeves. The resulting dye-carrier bath was then heated to boiling over a 30 minute period and held at boiling for another 30 minutes. A scour bath was prepared containing 6.25 mls. of a 1% Igepon T–51 solution, 3.1 mls. of a 1% $Na_2CO_3$ solution and 240 mls. water. The sleeves were scoured in this bath at 140° F. for fifteen minutes and then air dried.

The copolyester resin products of Examples 3 and 4 along with a polyethylene terephthalate resin control were subjected to a disperse dye test and the results are set forth below in the table.

The control was composed of a filament-forming polyethylene terephthalate homopolymer resin which was prepared with the same catalyst system and under the same reaction conditions used in Examples 3 and 4 above. The resulting control resin was processed into fibers, then drawn and knitted into a sleeve as were the resins of Examples 3 and 4.

TABLE

| Resin product: | Disperse dye value (Y in C.I.E. system) |
|---|---|
| (a) Example 3 copolymer resin fiber | 6.3 |
| (b) Example 4 copolyester resin fiber | 6.9 |
| (c) Polyethylene terephthalate control fiber | 14.2 |

The results in the above examples and those disclosed in the table clearly indicate that the resins of the present invention are particularly well suited for filament- and film-forming purposes and that they can be easily dyed with disperse dyes.

The intrinsic viscosities of the copolyester resin products of the above examples were measured in a 60% phenol, 40% tetrachloroethane solution (wt./wt.) at 30° C.

We claim:
1. A copolyester resin condensation polymerization product of (a) an aromatic dicarboxylic acid or its lower alkyl diester, (b) a glycol and (c) an effective amount of from about 1 to 20 mole percent based on reactant (a) of a compound represented by the formula

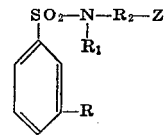

wherein R is —$COOR_3$ or

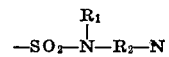

$R_1$ is a lower alkyl radical containing from 1 to 6 carbon atoms, $R_2$ is a $C_2$ to $C_6$ alkylene radical, $R_3$ is hydrogen or a lower alkyl radical containing from 1 to 6 carbon atoms, and Z is a hydroxyl or —$COOR_3$ radical.

2. A composition of claim 1 wherein (a) is dimethyl terephthalate.
3. A composition of claim 1 wherein (b) is ethylene glycol.
4. A composition of claim 1 wherein (a) is dimethyl terephthalate and (b) is ethylene glycol.
5. A composition of claim 4 wherein (c) is bis-[N-(2-hydroxyethyl)-N-methyl]-m-benzenedisulfonamide.
6. A composition of claim 4 wherein (c) is methyl m-[N-(2-hydroxyethyl)-N-methylsulfamoyl]benzoate.

References Cited
UNITED STATES PATENTS
3,546,180  12/1970  Caldwell et al.

MELVIN GOLDSTEIN, Primary Examiner

U.S. Cl. X.R.
8—DIG. 4; 260—76

UNITED STATES PATENT OFFICE
CERTIFICATE OF CORRECTION

Patent No. 3,700,644          Dated 24 October 1972

Inventor(s) John A. Price and Mary J. Stewart

It is certified that error appears in the above-identified patent and that said Letters Patent are hereby corrected as shown below:

Col. 3, line 12, "bis-[N-(4-hydroxybutyl)-N-butyl]" should read -- bis-[N-(4-carboxylbutyl)-N-ethyl] --; line 46, below the second benzene ring, add -- (P) --. Col. 4, line 22, "-N-methyl-m-" should read --  -N-methyl]-m-  --; line 46, "2-methylamino)" should read -- 2-(methylamino) --.  Col. 5, line 18, "perod" should read -- period --.  Col. 6, line 5, "raise" should read -- rise --; line 11, "trixoide" should read -- trioxide --; line 12, "heatted" should read -- heated --. Col. 7, line 7, "passing" should read -- pasting --. Col. 8, line 20, in the formula "$-SO_2-\overset{R}{N}-R_2-N$" should read -- $-SO_2-\overset{R}{\underset{|}{N}}-R_2-Z$ --.

Signed and sealed this 13th day of March 1973.

(SEAL)
Attest:

EDWARD M. FLETCHER, JR.
Attesting Officer

ROBERT GOTTSCHALK
Commissioner of Patents